(No Model.)
C. M. BROWN.
SHUFFLE HOE.
No. 602,425.  Patented Apr. 19, 1898.
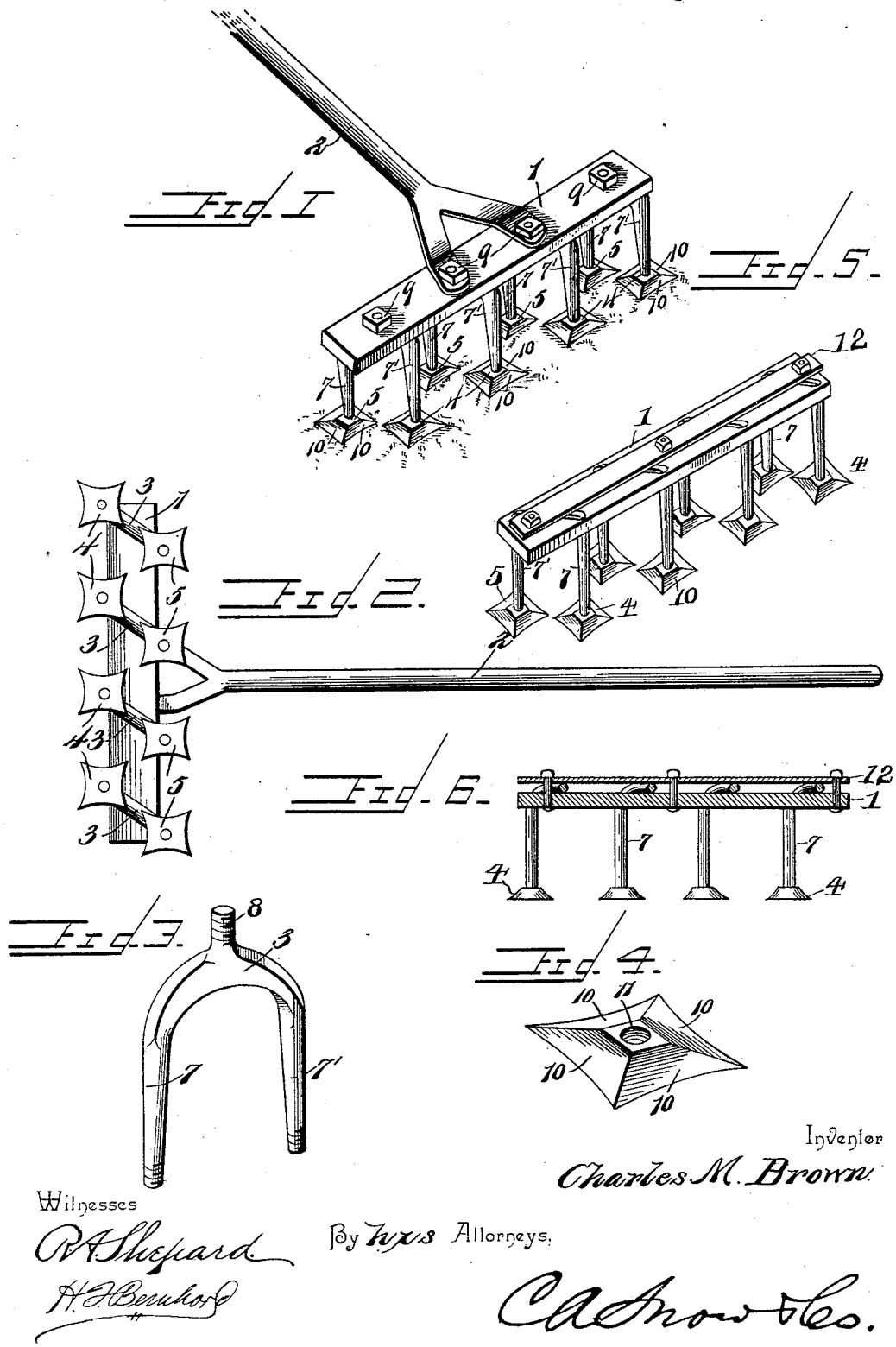
Witnesses
R. H. Shepard
H. H. Bernhost
Inventor
Charles M. Brown.
By his Attorneys,
C. A. Snow & Co.

UNITED STATES PATENT OFFICE.

CHARLES MUNROE BROWN, OF OCALA, FLORIDA, ASSIGNOR TO AUGUSTA F. BROWN, DECATUR W. DAVIS, AND WILLIAM HOLDER, OF SAME PLACE.

SHUFFLE-HOE.

SPECIFICATION forming part of Letters Patent No. 602,425, dated April 19, 1898.

Application filed July 8, 1897. Serial No. 643,874. (No model.)

*To all whom it may concern:*

Be it known that I, CHARLES MUNROE BROWN, a citizen of the United States, residing at Ocala, in the county of Marion and State of Florida, have invented a new and useful Shuffle-Hoe, of which the following is a specification.

My invention relates to a hand agricultural implement which I prefer to call a "shuffle-hoe," although the implement is designed for a twofold purpose—*i. e.*, for cutting weeds and grass and for cultivating the ground around growing plants without injury thereto.

The object of my invention is to provide a simple and inexpensive implement by which weeds and grass may be easily and quickly cut around growing plants and the ground cultivated in order to stimulate the growth of the same.

To the accomplishment of these ends my invention consists in the combination, with a cross-head and a suitable staff or handle, of a series of hangers attached to the head diagonally thereto and two series of cutters carried by said hangers and arranged in rows in alternate relation to each other, whereby the cutters of the rear series operate in the spaces left between the cutters of the front series.

The invention further consists in the novel construction of the cutter; and it consists, finally, in the construction and arrangement of parts, which will be hereinafter fully described and claimed.

To enable others to understand my invention, I have illustrated the preferred embodiment thereof in the accompanying drawings, forming a part of this specification, and in which—

Figure 1 is a perspective view of my shuffle-hoe. Fig. 2 is an inverted or bottom plan view of the implement, showing the arrangement of the two series of cutters more clearly. Fig. 3 is a detail perspective view of one of the hangers. Fig. 4 is a detail perspective view of one of the cutters, two series of which are embodied in my implement. Fig. 5 is a perspective view of a preferred embodiment of the hoe, showing the means for securing the hangers to the end; and Fig. 6 is a longitudinal sectional view through the construction shown by Fig. 5.

Like numerals of reference denote corresponding parts in all the figures of the drawings, referring to which—

1 designates the cross-head. 2 is the staff or handle. 3 is the series of hangers, and 4 5 are the two series of cutters, the whole arranged and combined in the novel manner shown by the drawings to produce an implement embodying my invention.

The cross-head 1 may consist of a flat plate or bar, either of wood or metal. The bar is provided with a series of vertical apertures spaced at suitable intervals to receive the shanks of the hangers. The handle or staff may be of any suitable form and material; but, as shown in the drawings, the staff has a forked extremity, which is securely fastened to the cross-head in any suitable way.

Each hanger 3 of the series provided in my implement is preferably wrought or made in a single piece of metal. The hanger is substantially in the form of an inverted U to provide the parallel members 7 7', joined by a head, centrally from which extends the vertical shank 8, that passes through the vertical aperture in the cross-head 1. The upper extremity of the attaching-shank 8 of each hanger is threaded to receive a clamping-nut 9, by which the hanger is attached rigidly to the cross-head 1 of the implement.

The series of hangers used in my implement are arranged diagonally across the head 1 at an angle, preferably, of forty-five degrees to axial line of said head, and thus the hangers are arranged in parallel relation to each other and each hanger occupies a position where its front and rear members 7 7' are out of alinement with each other lengthwise of the implement.

The front row of cutters 4 are attached to the members 7 of the hangers, while the rear row of cutters 5 are attached to the other members 7' of said hangers. The cutters are thus disposed in alternate relation to each other, and the rear cutters 5 are arranged to cut the weeds or grass in the spaces between the cutters of the front row, whereby the efficiency and utility of the implement are promoted and the grass and weeds can be cut to better advantage and in a shorter space of time than if a single row of cutters was used.

Each cutter consists of a substantially square plate of metal with cutting edges 10 on each of its four sides. I prefer to make each cutting edge of the plate slightly convex in form, and to give to the lower face of the cutter a slightly convex shape; but the particular shape of the cutter is not material and the same may be varied or changed within wide limits without departing from my invention. In the thickened center of the cutter is produced a vertical aperture 11, which is interiorly screw-threaded, to enable said cutter to be screwed on the threaded lower extremity of one of the members of a hanger; but this method of fastening the cutter to the hanger is optional and other fastening means may be employed, if desired.

The implement is operated by placing its cutters on the ground adjacent to or between growing plants and moving the implement back and forth over the ground in a horizontal plane. The edges of the cutters operate to cut and sever the weeds and grass in the path thereof without injury to the growing plants, and the implement may also be used to rake the cut weeds and grass into a heap. As the cutter is worn by use it can be adjusted on its connection with the hanger to present all its edges until the cutter is entirely out.

My implement enables a man to accomplish considerably more work than other styles of weeding-hoes known to me, and the implement may be used in a manner to make the dirt appear as if it had been worked with an old form of weeding-hoe and then neatly raked over.

Various changes in the form and proportion of parts may be made without departing from the spirit or sacrificing the advantages of my invention—as, for instance, the number of hangers and cutters may be increased or diminished, as desired.

In the construction hereinbefore described, in which the hangers are provided with short attaching-shanks 8, the shanks are liable to be broken off when the implement is in service. As a means for preventing this injury to the implement I prefer to employ the construction shown by Figs. 5 and 6 of the drawings. In this, the preferred embodiment of my invention, I provide the cross-head 1 with a series of apertures, through which are passed the shanks or legs of the hangers. The hangers have flat heads to bear upon the upper side or face of the cross-head 1, and the hangers are secured in place by a fastening-plate 12, which is common to all the hangers. This fastening-plate is applied to the heads of the hangers, and said plate is secured in position on the cross-head 1 by bolts or in any other suitable manner.

In the embodiment of my invention shown by Figs. 5 and 6 the hangers are arranged in the diagonal position on the cross-head in order to have the cutters of the two rows arranged in alternate relation to each other. While I have shown two methods of fastening the hangers to the cross-head, I prefer to employ the construction shown by Figs. 5 and 6, because the hangers are liable to be broken when the implement is subjected to rough service.

Having thus fully described my invention, what I claim as new, and desire to secure by Letters Patent, is—

1. A shuffle-hoe comprising a head, hangers attached to said head, two series of horizontal cutters sharpened front and rear and carried by the hangers and arranged in alternate relation one to the other, and a suitable operating handle or staff attached to the head to move the head and cutters back and forth in the service of the implement, substantially as described.

2. A shuffle-hoe comprising a head, a series of double-armed hangers attached diagonally to the head, two series of horizontal cutters sharpened front and rear and attached to the front and rear arms of the hangers and with the cutters of one series in alternate relation to the cutters of the other series, and an operating staff or handle attached to the head and serving to reciprocate the head and cutters back and forth in the service of the implement, substantially as described.

3. A shuffle-hoe comprising a head, hangers attached to said head, the front and rear series of horizontal cutter-blades attached to the hangers with one series of cutter-blades in alternate relation to the other series of cutter-blades, each cutter-blade having working edges at the front and rear sides thereof, and a suitable operating-handle attached to the head and serving to reciprocate the implement back and forth in the service thereof, substantially as described.

4. In a shuffle-hoe, the hangers each consisting of a single piece provided with parallel members and with a central attaching-shank, combined with a head to which the hangers are fastened, and cutters sharpened front and rear and attached to the parallel members of said hangers, as and for the purposes described.

5. A shuffle-hoe comprising a head, a series of hangers arranged diagonally to the head and fastened thereto, and two series of cutters attached to the hangers and arranged in alternate relation to each other, each cutter comprising a substantially square plate having cutting edges on each side thereof, as and for the purposes described.

6. A shuffle-hoe comprising a cross-head, hangers passed through said head diagonally thereto and carrying the two series of cutters, which are sharpened at their front and rear edges, and a common fastening-plate attached to said cross-head, as and for the purposes described.

7. A hand-operated shuffle-hoe comprising a longitudinal head, a handle, two series of horizontal cutters sharpened front and rear and arranged one in rear of the other and with the cutters of one row arranged in alternate relation to the cutters of the other row, and means for uniting the individual cutters rigidly to the head, substantially as and for the purposes described.

In testimony that I claim the foregoing as my own I have hereto affixed my signature in the presence of two witnesses.

CHARLES MUNROE BROWN.

Witnesses:
S. T. SISTRUNK,
C. V. MILLER.